(No Model.)

C. W. SCHREIBER.
DRIVE WELL.

No. 273,166. Patented Feb. 27, 1883.

WITNESSES:
Fred. G. Dieterich.
J. G. Hinkel.

INVENTOR,
Charles W. Schreiber,
Joseph S. Morgan.
ATTORNEYS

United States Patent Office.

CHARLES W. SCHREIBER, OF DUBUQUE, IOWA, ASSIGNOR OF TWO-THIRDS TO FRANK ROBINSON AND JOSEPH S. MORGAN, OF SAME PLACE.

DRIVE-WELL.

SPECIFICATION forming part of Letters Patent No. 273,166, dated February 27, 1883.

Application filed January 8, 1883. (No model.)

*To all whom it may concern:*

Be it known that I, CHARLES W. SCHREIBER, a citizen of the United States, residing at Dubuque, in the county of Dubuque and State of Iowa, have invented a new and useful Drive-Well, of which the following is a specification.

The object of this invention is to provide the lower end of a drive-well tube with a strainer that cannot be injured in driving, and also to provide the lower end of the tube with a cast-steel point, that will prevent the tube from swelling or splitting when being driven, and which will also not be easily blunted.

Figure 1:
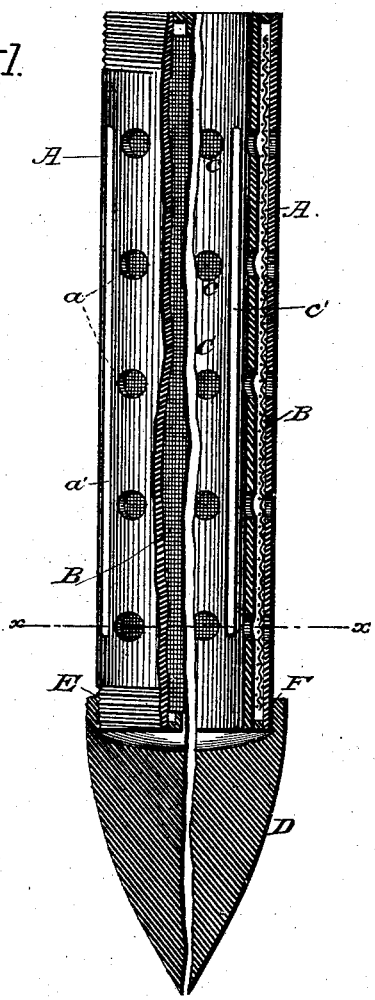
Figure 2:
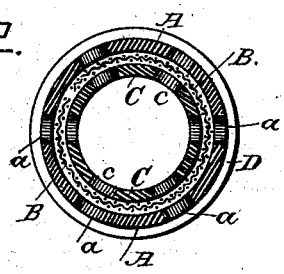

Figure 1 represents a sectional view of the device, and Fig. 2 a cross-section thereof.

A represents the bottom piece of tubing, which may correspond in size with the other sections of the drive-well. It is perforated, as shown at $a$, or may be slitted, as shown at $a'$, for the admission of water. The part A is provided with means for coupling it to the next tube above, and it, in fact, forms the lowermost section of the drive-tube. This part A will hereinafter be designated as the "drive-tube section," to distinguish it from the various sleeves and tubes used in drive-wells, that are slipped over or attached to this lowermost section of the main tubing. A strainer, B, preferably made from a sheet of brass wire-gauze bent into the form of a cylinder, is placed inside the drive-tube section A. The meeting edges of the gauze are preferably not soldered, but approach sufficiently near to each other, as shown at $x$, Fig. 2, to prevent the passage of impurities. Any other form of strainer may be used—as, for instance, a finely-perforated cylinder or a coiled wire. Inside the gauze is placed a cylinder, C, which is provided with perforations $c$ or slits $c'$, that register with the perforates $a$ or slits $a'$ of the tube A. This cylinder C, which may be a piece of tubing, prevents the collapsing of the strainer and affords it a firm backing. The cylinder C and the strainer are fastened to the drive-tube section A, preferably by soldering their ends together and to it, which prevents the strainer or cylinder from working loose and getting out of position. By making the strainer sufficiently strong this cylinder C could be omitted; but I prefer to use it. The strainer need only be soldered at one end, although I prefer to solder it at both ends to the outside drive-tube section. The point D is made of cast-steel, and is provided with a socket, $d$, in which the drive-tube section rests. This socket may be threaded, as shown at E, in which case the point is screwed on the drive-tube section A; or it may be plain, as shown at F, in which case the point is driven or shrunk on the drive-tube section A. The drive-tube section A may be slightly tapered on its lower end to facilitate its introduction into the point. As the point surrounds the lower end of the drive-tube section A the latter cannot swell or split in driving, and thus derange the strainer. If the point were of cast-iron, it would itself break, and if it were of steel and extended inside the tube it would split it, which difficulties are avoided by this feature of my invention.

Attention is called to the fact that my strainer-section is composed of only three parts—viz., the perforated drive-tube section, the inside perforated cylinder, and the intermediate gauze—and that the outside drive-tube section is coupled to the next section above by an ordinary screw-coupling, and is, in fact, merely one section of the tubing. The attachments are therefore all inside, where they cannot be cut or deranged in driving, and are not secured by or dependent in any way on the screw-couplings by which the tube-section A is connected to the next section, in which respect my invention differs from those cases where the gauze has been put on the outside of the tube and protected by sliding sleeves, &c., as has been heretofore proposed. The drive-tube section has to be made of considerable strength to enable it to be driven. The great advantage of my construction is, that I utilize this strong and necessary drive-tube section to protect the strainer attachments, which are all inside, and which can therefore be made very thin and light, and consequently cheaply, especially if made of brass.

What I claim is—

1. A strainer-section composed of three parts—viz., a perforated outside drive-tube section, an inside perforated cylinder, and an intermediate strainer.

2. A strainer-section composed of an outside drive-tube section, a strainer, and a backing therefor, all soldered together.

3. In combination with suitable supports, a strainer-cylinder bent from a sheet of gauze, and having unsoldered meeting edges.

4. A perforated drive-tube section, in combination with the straining members inside and soldered thereto at top and bottom only.

5. In combination with a perforated drive-tube section, an inside strainer-cylinder soldered thereto.

6. The combination of an outside perforated drive-tube section, an inside perforated backing-cylinder, and an intermediate strainer-cylinder, all soldered together at one end.

7. The combination, in a drive-point, of a strainer-cylinder and its support soldered together.

8. The combination of a perforated drive-tube section, an inside strainer, and a cast-steel point having a socket for the tube.

9. The combination of an outside perforated drive-tube section, an inside perforated backing, an intermediate strainer-section, and a cast-steel point having a socket for the tube.

CHARLES W. SCHREIBER.

Witnesses:
CHAS. W. WARE,
F. B. DANIELS.